(12) United States Patent
Imai et al.

(10) Patent No.: US 10,228,075 B2
(45) Date of Patent: Mar. 12, 2019

(54) FLUID DEVICE

(71) Applicant: Surpass Industry Co., Ltd., Gyoda-shi, Saitama (JP)

(72) Inventors: Takashi Imai, Gyoda (JP); Masahiro Hasunuma, Gyoda (JP); Kazuki Hirai, Gyoda (JP)

(73) Assignee: SURPASS INDUSTRY CO., LTD., Saitama (JP)

( * ) Notice: Subject to any disclaimer, the term of this patent is extended or adjusted under 35 U.S.C. 154(b) by 0 days.

(21) Appl. No.: 15/426,233

(22) Filed: Feb. 7, 2017

(65) Prior Publication Data

US 2018/0038505 A1 Feb. 8, 2018

(30) Foreign Application Priority Data

Aug. 5, 2016 (JP) ................................. 2016-154410

(51) Int. Cl.
*F16K 31/126* (2006.01)
*F16K 27/02* (2006.01)

(52) U.S. Cl.
CPC .......... *F16K 31/1262* (2013.01); *F16K 27/02* (2013.01); *F16K 31/1266* (2013.01)

(58) Field of Classification Search
CPC ............. F16K 31/1262; F16K 31/1264; F16K 31/1266; F16K 27/02

(Continued)

(56) References Cited

U.S. PATENT DOCUMENTS 4,357,748 A * 11/1982 Branson ................. H01H 35/40
137/503
4,717,117 A * 1/1988 Cook ................. B60G 17/0528
251/331

(Continued)

FOREIGN PATENT DOCUMENTS

JP  S63155231 U  6/1988
JP  H06341561 A  12/1994

(Continued)

OTHER PUBLICATIONS

European Extended Search Report in dated Mar. 8, 2017 in EP Application No. 16193143.1, 7 pages.

*Primary Examiner* — Robert K Arundale
*Assistant Examiner* — Jonathan J Waddy
(74) *Attorney, Agent, or Firm* — MH2 Technology Law Group, LLP

(57) ABSTRACT

Provided is a flow rate adjustment device including: a valve body portion configured to be movable along an axis line; a body portion having a valve bore and an upstream-side fluid chamber formed therein, the valve body portion being inserted into the valve bore, the upstream-side fluid chamber being configured to circulate a fluid; and a thin film-like first diaphragm portion which is coupled to the valve body portion and configured to isolate the upstream-side fluid chamber from a spring accommodation chamber adjacent to the upstream-side fluid chamber. The first diaphragm portion is formed of a conductive fluororesin material including a fluororesin material and carbon nanotubes dispersed in the fluororesin material, and the conductive fluororesin material has a volume resistivity of more than $1.0 \times 10^3$ Ω·cm and less than $1.0 \times 10^4$ Ω·cm.

8 Claims, 11 Drawing Sheets

(58) Field of Classification Search
USPC .............................................. 251/61.2, 61.5
See application file for complete search history.

(56) References Cited

U.S. PATENT DOCUMENTS

| | | | |
|---|---|---|---|
| 5,494,258 A | | 2/1996 | Weissgerber et al. |
| 5,941,501 A | * | 8/1999 | Biegelsen .............. B65G 51/03 |
| | | | 251/129.01 |
| 6,382,588 B1 | * | 5/2002 | Hierold .................. F02M 51/06 |
| | | | 251/129.01 |
| 8,002,894 B2 | * | 8/2011 | Higashijima ..... H01L 21/67017 |
| | | | 118/715 |
| 9,995,415 B2 | * | 6/2018 | Imai .................... F16K 31/1266 |
| 2001/0052366 A1 | | 12/2001 | Ozawa |
| 2001/0052368 A1 | | 12/2001 | Harms et al. |
| 2003/0021929 A1 | | 1/2003 | Takahashi et al. |
| 2004/0004199 A1 | | 1/2004 | Igarashi |
| 2005/0285064 A1 | * | 12/2005 | Yoshino .............. F16K 31/1221 |
| | | | 251/61.5 |
| 2006/0060004 A1 | | 3/2006 | Desroachers et al. |
| 2007/0215224 A1 | * | 9/2007 | Furukawa ............. F04B 43/043 |
| | | | 137/833 |
| 2009/0267346 A1 | | 10/2009 | Hasunama |
| 2013/0207010 A1 | * | 8/2013 | Hirai .................... F16K 31/1266 |
| | | | 251/58 |
| 2014/0231682 A1 | * | 8/2014 | Hirai ........................ G05D 7/03 |
| | | | 251/62 |
| 2015/0028243 A1 | | 1/2015 | Bernhardt et al. |
| 2015/0123394 A1 | | 5/2015 | Breay et al. |
| 2015/0129791 A1 | * | 5/2015 | Okita ........................ F16K 7/14 |
| | | | 251/331 |
| 2015/0345660 A1 | | 12/2015 | Kho |

FOREIGN PATENT DOCUMENTS

| | | |
|---|---|---|
| JP | H09196199 A | 7/1997 |
| JP | 20034176 A | 1/2003 |
| JP | 2004036765 A | 2/2004 |
| JP | 2008545990 A | 12/2008 |
| JP | 200924749 A | 2/2009 |
| JP | 2010-121689 A | 6/2010 |
| JP | 2015021618 A | 2/2015 |
| JP | 3198694 U | 6/2015 |
| JP | 2015110732 A | 6/2015 |
| WO | 2007066791 A1 | 6/2007 |

* cited by examiner

FLUID DEVICE

CROSS-REFERENCE TO RELATED APPLICATIONS

This application is based on Japanese Patent Application No. 2016-154410, the contents of which are incorporated herein by reference in their entirety.

TECHNICAL FIELD

The present disclosure relates to a fluid device including a diaphragm portion formed of a conductive resin material.

BACKGROUND

Fluororesin material is widely used for fluid devices in which corrosive fluid, pure water, or the like used for semiconductor production is circulated, because the fluororesin material is superior in chemical resistance and stain resistance.

The fluororesin material has a volume resistivity of more than $10^{18}$ $\Omega\cdot$cm and is generally classified as an insulating material. Accordingly, charging due to a friction between a fluid flow channel formed in a fluid device and a fluid may occur in the fluid device formed using the fluororesin material.

To prevent the occurrence of charging, it is possible to impart conductivity to the fluororesin material by containing a conductive material, such as carbon black or iron powder, in the fluororesin material. However, metal ions are eluted from the conductive material due to contact between the conductive material and a fluid, which may result in contamination of the fluid.

In this regard, an antistatic fluororesin tube is known in which a conductive portion made of a fluororesin composition containing a conductive material is embedded in an outer peripheral surface of the antistatic fluororesin tube in a stripe shape to thereby impart conductivity (for example, see Japanese Unexamined Patent Application, Publication No. 2003-4176, hereinafter referred to as "JP 2003-4176"). In the antistatic fluororesin tube disclosed in JP 2003-4176, since the conductive material and the fluid are not in contact, the fluid is not contaminated with metal ions eluted from the conductive material.

A fluid device that adjusts the flow rate of a fluid circulated through a fluid flow channel by adjusting the amount of insertion of a valve body portion to be inserted into a valve bore is known. Further, a fluid device having a structure in which a thin film-like diaphragm portion that isolates a fluid flow channel from an adjacent space adjacent to the fluid flow channel is coupled to the valve body portion is known.

SUMMARY

The inventors have obtained findings that in a fluid device including a diaphragm portion, when static electricity is generated in the fluid device due to a friction between a fluid flow channel and a fluid, a resin material forming the thin film-like diaphragm portion is likely to cause a dielectric breakdown. When the thin film-like diaphragm portion causes a dielectric breakdown, a defect that the fluid circulated through the fluid flow channel flows out from the diaphragm portion occurs.

The present disclosure has been made in view of the above-mentioned circumstances, and an object of the present disclosure is to provide a fluid device that prevents the occurrence of a defect that a thin film-like diaphragm portion causes a dielectric breakdown and a fluid circulated through a fluid flow channel flows out from a diaphragm portion.

Solution to Problem

To solve the above-mentioned problem, the present disclosure employs the following solutions.

A fluid device according to one aspect of the present disclosure includes: a valve body portion configured to be movable along an axis line; a body portion having a valve bore and a fluid flow channel formed therein, the valve body portion being inserted into the valve bore, the fluid flow channel being configured to circulate a fluid; and a thin film-like diaphragm portion coupled to the valve body portion and configured to isolate the fluid flow channel from an adjacent space adjacent to the fluid flow channel. The diaphragm portion is formed of a conductive fluororesin material including a fluororesin material and carbon nanotubes dispersed in the fluororesin material. The conductive fluororesin material has a volume resistivity of more than $1.0\times10^3$ $\Omega\cdot$cm and less than $1.0\times10^4$ $\Omega\cdot$cm.

In the fluid device according to one aspect of the present disclosure, the thin film-like diaphragm portion which isolates the fluid flow channel coupled to the valve body portion from the adjacent space adjacent to the fluid flow channel is formed of a conductive fluororesin material having a volume resistivity of more than $1.0\times10^3$ $\Omega\cdot$cm and less than $1.0\times10^4$ $\Omega\cdot$cm. The volume resistivity of the conductive fluororesin material is set to a value sufficient to prevent charging due to a friction between the diaphragm portion and the fluid, thereby making it possible to prevent the occurrence of charging in the diaphragm portion. Accordingly, it is possible to prevent a defect that the thin film-like diaphragm portion causes a dielectric breakdown and the fluid circulated through the fluid flow channel flows out from the diaphragm portion.

In the fluid device according to one aspect of the present disclosure, the conductive fluororesin material preferably contains the carbon nanotubes at a ratio of 0.020 weight % or more and 0.030 weight % or less. A constant conductivity is imparted to the diaphragm portion by dispersing 0.020 weight % or more of carbon nanotubes in the conductive fluororesin material forming the diaphragm portion in direct contact with the fluid, thereby making it possible to prevent charging. This is because, when tube-like carbon nanotubes having a predetermined length are used as a conductive material, conductivity can be imparted with a small number of carbon nanotubes, as compared with other granular conductive materials such as carbon black and iron powder.

Further, when the ratio of the carbon nanotubes contained in the conductive fluororesin material is a small ratio of 0.030 weight % or less, it is possible to prevent contamination of the fluid due to contact between the fluid flow channel and the fluid, as compared with other granular conductive materials such as carbon black and iron powder.

According to the fluid device having a structure as described above, it is possible to provide a fluid device that prevents charging due to a friction between the diaphragm portion and the fluid and also prevents contamination of the fluid due to contact between the diaphragm portion and the fluid.

The fluid device according to one aspect of the present disclosure may include a metal member disposed in the adjacent space. In the fluid device having a structure described above, when the diaphragm portion is charged, a phenomenon of discharge toward the metal member disposed in the adjacent space from the diaphragm portion is likely to occur. When the discharge phenomenon occurs, the diaphragm portion may cause a dielectric breakdown. In the fluid device having a structure as described above, the volume resistivity of the conductive fluororesin material forming the diaphragm portion disposed adjacent to the metal member is larger than $1.0 \times 10^3$ Ω·cm and less than $1.0 \times 10^4$ Ω·cm. Accordingly, the volume resistivity of the diaphragm portion is set to a value sufficient to prevent charging due to a friction with the fluid, thereby making it possible to prevent the occurrence of charging in the diaphragm portion.

In the fluid device having a structure as described above, the metal member may be a spring that imparts an urging force in a direction along the axis line to the valve body portion. With this structure, it is possible to prevent a defect that a phenomenon of discharge toward the spring disposed in the adjacent space from the diaphragm portion occurs and the diaphragm portion causes a dielectric breakdown.

The fluid device described above may include a conductive member which is made of metal and attached in contact with the spring and the diaphragm portion. With this structure, the spring is maintained at the same potential as the diaphragm portion, thereby preventing the occurrence of the phenomenon of discharge toward the spring disposed in the adjacent space from the diaphragm portion.

In the fluid device according to one aspect of the present disclosure, the body portion may be formed of the conductive fluororesin material. With this structure, the volume resistivity of the body portion is set to a value sufficient to prevent charging due to a friction between the body portion and the fluid, thereby making it possible to prevent the occurrence of charging in the body portion. Accordingly, it is possible to prevent a defect that the body portion is charged and causes a dielectric breakdown.

In the fluid device according to one aspect of the present disclosure, the valve body portion and the diaphragm portion coupled to the valve body portion are integrally formed of the conductive fluororesin material. With this structure, the volume resistivity of the valve body portion integrally formed of the diaphragm portion and the diaphragm portion is set to a value sufficient to prevent charging due to a friction between the diaphragm portion and the valve body portion, and the fluid, thereby making it possible to prevent the occurrence of charging in the diaphragm portion and the valve body portion.

Advantageous Effects—According to the present disclosure, it is possible to provide a fluid device that prevents a defect that a thin film-like diaphragm portion causes a dielectric breakdown and a fluid circulated through a fluid flow channel flows out from a diaphragm portion.

DETAILED DESCRIPTION

First Embodiment

A flow rate adjustment device (fluid device) 100 according to a first embodiment of the present disclosure will be described below with reference to the drawings. The flow rate adjustment device 100 of the first embodiment is a fluid device that is installed in a pipe through which a fluid (liquid such as drug solution or pure water) used for semiconductor manufacturing devices and the like is circulated.

Figure 1:
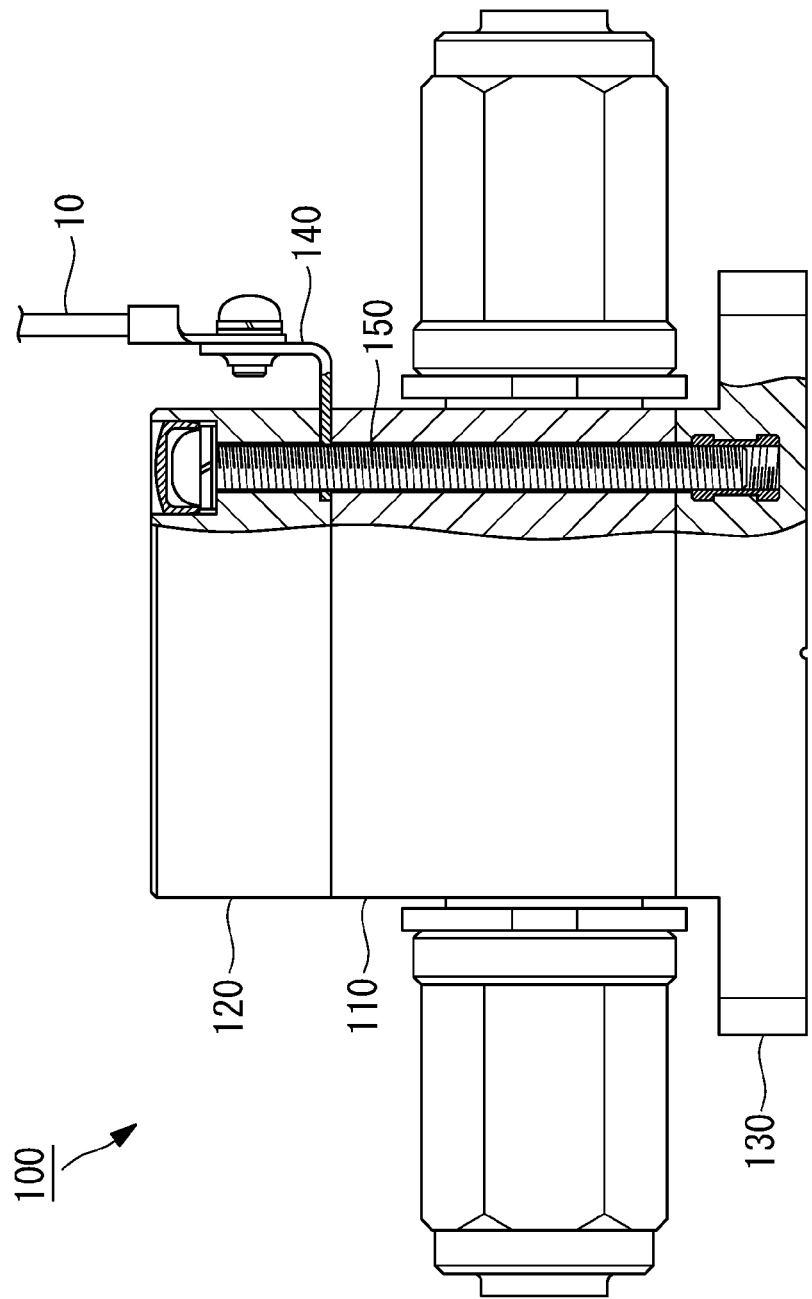
FIG. 1 is a front view showing a flow rate adjustment device of a first embodiment.
Figure 2:
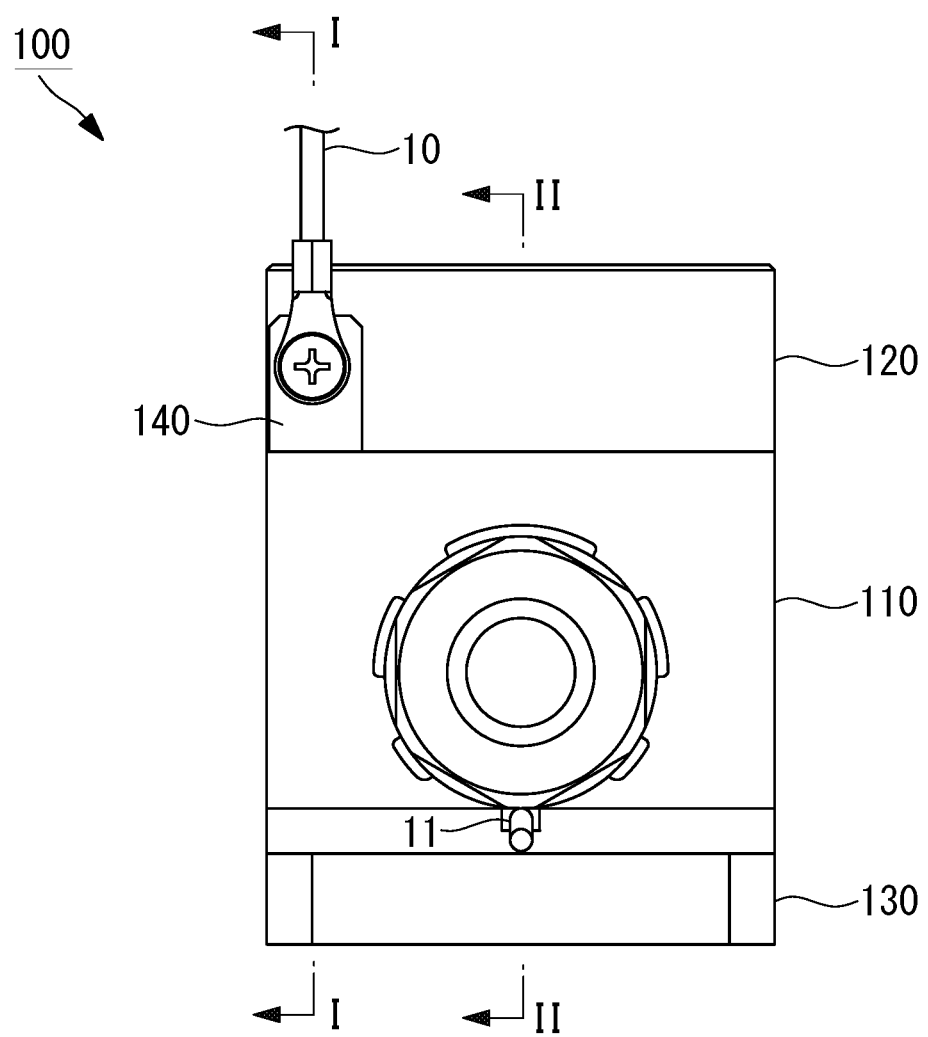
FIG. 2 is a right side view of the flow rate adjustment device shown in FIG. 1.
Figure 3:
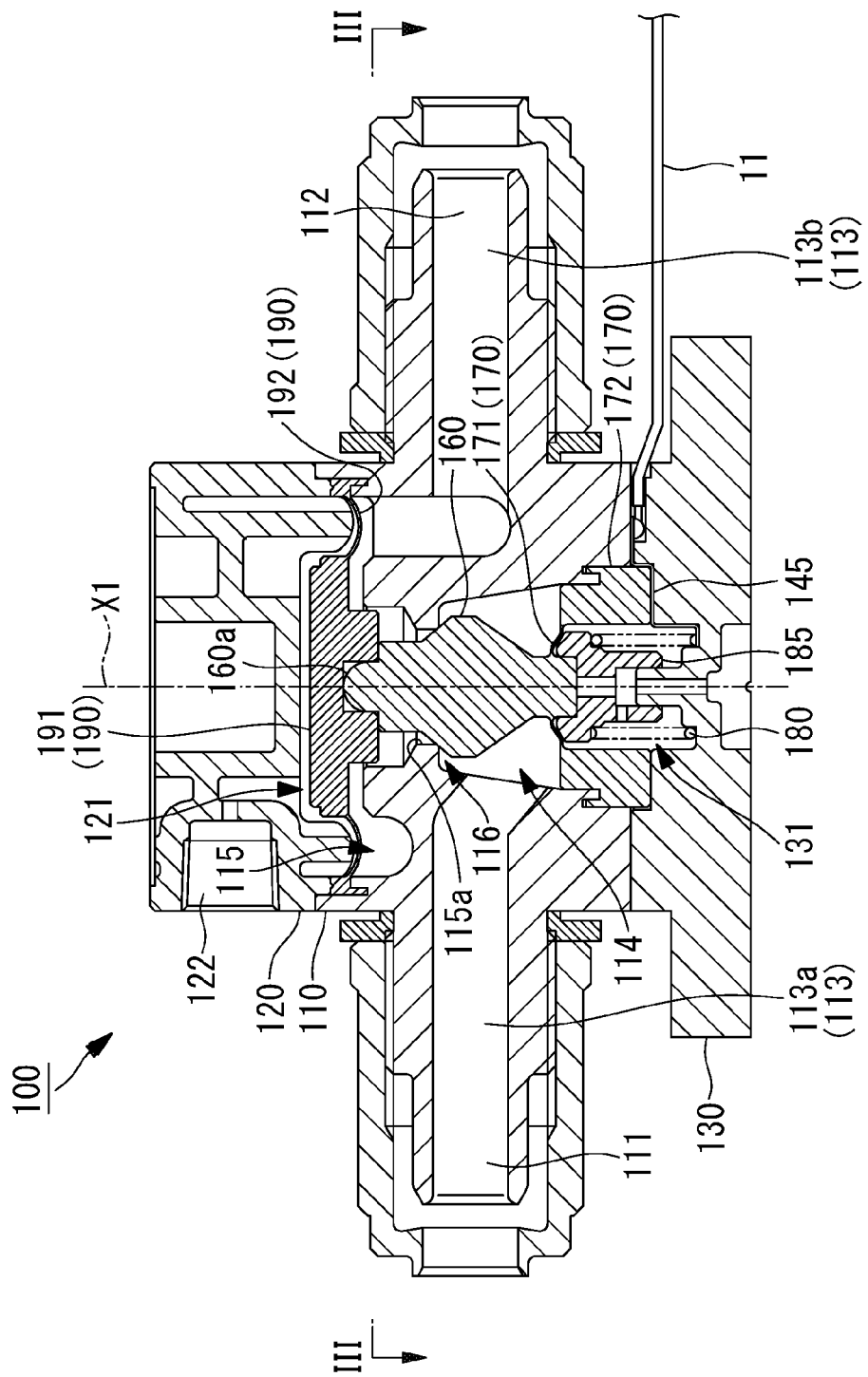
FIG. 3 is a longitudinal sectional view of the flow rate adjustment device shown in FIG. 1.

The front view of the flow rate adjustment device 100 shown in FIG. 1 shows a partial sectional view taken along a line I-I in the right side view of the flow rate adjustment device 100 shown in FIG. 2. FIG. 3 is a sectional view taken along a line II-II of the flow rate adjustment device 100 shown in FIG. 2.

As shown in FIGS. 1 to 3, the flow rate adjustment device 100 includes a housing portion or body portion 110, an upper housing 120, a lower housing 130, a conductive member 140, a conductive member 145, a fastening bolt 150, a valve body portion 160, a first diaphragm portion 170, a spring (metal member) 180, and a second diaphragm portion 190.

The components of the flow rate adjustment device 100 will be described below.

The body portion 110 is a member in which a fluid flow channel (a fluid flow channel 113, an upstream-side fluid chamber 114, a downstream-side fluid chamber 115 which are described later) which guide the fluid from an inflow port 111 to an outflow port 112 are formed. As described later, the body portion 110 is formed of a conductive fluororesin material including a fluororesin material and carbon nanotubes dispersed in the fluororesin material.

The fluid flow channel formed in the body portion 110 includes the fluid flow channel 113, the upstream-side fluid chamber (fluid flow channel) 114, and the downstream-side fluid chamber (fluid flow channel) 115. The fluid flow channel 113 includes an upstream-side flow channel 113a which communicates with the inflow port 111 to which the fluid is guided from an upstream-side pipe (not shown), and a downstream-side flow channel 113b which communicates with the outflow port 112 which guides the fluid to a downstream-side pipe (not shown). The fluid flowing into the upstream-side flow channel 113a is guided to the upstream-side fluid chamber 114, and the fluid guided to the upstream-side fluid chamber 114 is further guided to the downstream-side fluid chamber 115. The fluid guided to the downstream-side fluid chamber 115 is further guided to the downstream-side flow channel 113b.

The upper housing 120 is a member which is disposed above the body portion 110 and accommodates the second diaphragm portion 190 in a space formed between the upper housing 120 and the body portion 110.

The lower housing 130 is a member which is disposed below the body portion 110 and accommodates the valve body portion 160 and the first diaphragm portion 170 in a space formed between the body portion 110 and the lower housing 130.

As shown in FIG. 1, the body portion 110, the upper housing 120, and the lower housing 130 are integrally formed by fastening the upper housing 120 and the lower housing 130 with a fastening bolt 150 in a state where the body portion 110 is sandwiched therebetween.

The conductive member 140 is a member which is made of metal and attached in contact with the body portion 110 between the body portion 110 and the upper housing 120. The conductive member 140 is connected to a ground cable 10 which is maintained at a ground potential.

The conductive member 145 is a member which electrically connects the spring 180, which is made of metal as described later, to the first diaphragm portion 170 which is imparted with conductivity, thereby maintaining the spring 180 and the first diaphragm portion 170 at the same potential. As shown in FIG. 3, the conductive member 145 is connected to a ground cable 11 which is maintained at the ground potential. Accordingly, the spring 180 and the first diaphragm portion 170 are each maintained at the ground potential.

As shown in FIG. 3, the valve body portion 160 is a member which is formed into a shaft shape along an axis line X1 and is inserted into a valve bore 115a and guides the fluid from the upstream-side fluid chamber 114 to the downstream-side fluid chamber 115. The valve body portion 160 is configured to be movable along the axis line X1 due to a contrary force generated by the pressure chamber 121 to be described later.

The upstream-side fluid chamber 114 is an annular space formed so as to communicate with the upstream-side flow channel 113a and surround the valve body portion 160 about the axis line X1. The downstream-side fluid chamber 115 is a space which communicates with the upstream-side fluid chamber 114 and the downstream-side flow channel 113b and is formed between the body portion 110 and the lower surface of the second diaphragm portion 190.

Figure 4:
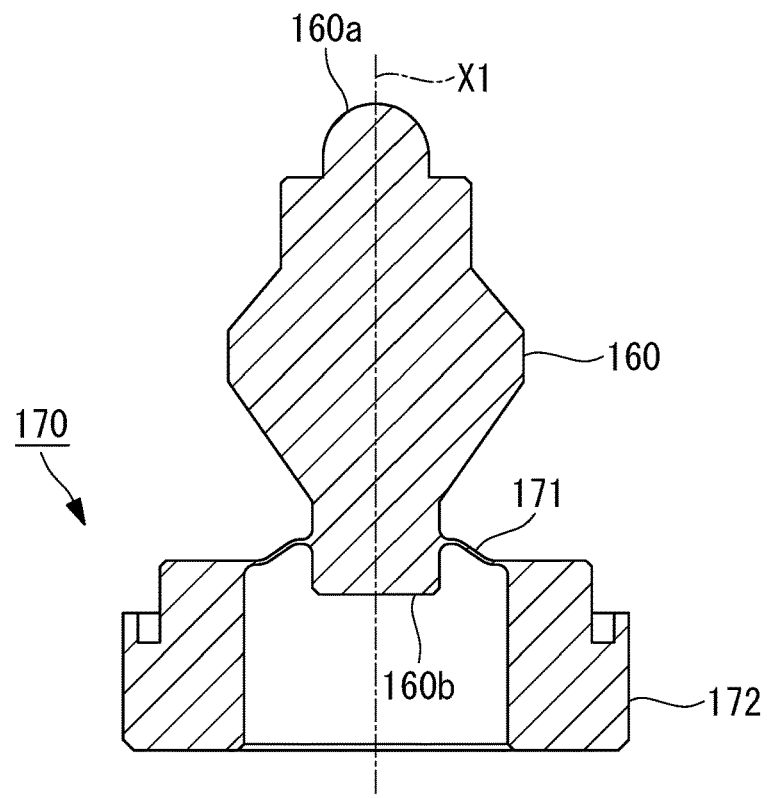
FIG. 4 is a longitudinal sectional view of a valve body portion and a first diaphragm portion shown in FIG. 3.

As shown in FIG. 4, the first diaphragm portion 170 is a member which includes a thin-film portion 171 that is coupled to the outer peripheral surface of a lower end 160b of the valve body portion 160 disposed in the upstream-side fluid chamber 114, and a base 172 that is coupled to the outer periphery of the thin-film portion 171.

The first diaphragm portion 170 and the valve body portion 160 are integrally formed of a conductive fluororesin material to be described later. The thin-film portion 171 is formed into an annular shape about the axis line X1 and is formed into a thin film shape with a thickness of 0.2 mm to 0.5 mm. Accordingly, the thin-film portion 171 has flexibility that allows the thin-film portion 171 to be deformable along with a movement of the valve body portion 160 along the axis line X1.

As shown in FIG. 3, the first diaphragm portion 170 is a member disposed in a state where the base 172 is sandwiched between the body portion 110 and the lower housing 130. The first diaphragm portion 170 forms the upstream-side fluid chamber 114 between the upper surface of the first diaphragm portion 170 and the body portion 110, and a spring accommodation chamber (adjacent space) 131 is formed between the lower surface of the first diaphragm portion 170 and the lower housing 130.

Thus, the first diaphragm portion 170 is coupled to the valve body portion 160, and isolates the upstream-side fluid chamber 114 from the spring accommodation chamber 131 that is adjacent to the upstream-side fluid chamber 114.

The spring (metal member) 180 is a member made of metal (for example, made of stainless steel) which generates an urging force in a direction in which the valve body portion 160 is brought into contact with the valve bore 115a along the axis line X1 of the valve body portion 160. A lower end of the spring 180 is disposed in contact with the lower housing 130 that forms a part of the spring accommodation chamber 131, and an upper end of the spring 180 is disposed in contact with the spring support portion 185. An upper end of the spring support portion 185 is coupled to the lower end 160b of the valve body portion 160. Accordingly, the urging force generated by the spring 180 is transmitted to the lower end 160b of the valve body portion 160 through the spring support portion 185.

Figure 5:
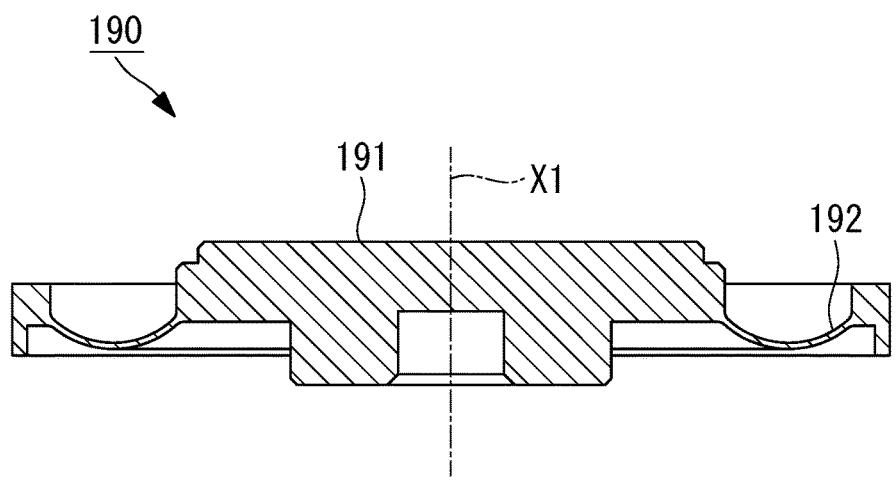
FIG. 5 is a longitudinal sectional view of a second diaphragm portion shown in FIG. 3.

As shown in FIGS. 3 and 5, the second diaphragm portion 190 is a member which includes a disc-like base 191 that is coupled to the upper end 160a of the valve body portion 160 inserted into the downstream-side fluid chamber 115, and a thin-film portion 192 that is coupled to the outer peripheral side of the base 191 and is formed into an annular shape about the axis line X1.

The second diaphragm portion 190 has a structure in which the base 191 and the thin-film portion 192 are integrally formed of a conductive fluororesin material to be described later. The thin-film portion 192 is formed into a thin film shape with a thickness of 0.2 mm to 0.5 mm. Accordingly, the thin-film portion 192 has flexibility that allows the thin-film portion 192 to be deformable along with a movement of the valve body portion 160 along the axis line X1.

As shown in FIG. 3, the second diaphragm portion 190 is a member disposed in a state where the second diaphragm portion 190 is sandwiched between the body portion 110 and the upper housing 120. The second diaphragm portion 190 forms the downstream-side fluid chamber 115 between the lower surface of the second diaphragm portion 190 and the body portion 110, and also forms the pressure chamber (adjacent space) 121 between the upper surface of the second diaphragm portion 190 and the upper housing 120.

Thus, the second diaphragm portion 190 is coupled to the valve body portion 160 and isolates the downstream-side fluid chamber 115 from the pressure chamber 121 adjacent to the downstream-side fluid chamber 115.

The pressure chamber 121 is a space into which a compressed air is introduced from an external compressed air supply source (not shown) through the air introduction portion 122. The pressure chamber 121 generates a contrary force in a direction in which the valve body portion 160 is spaced apart from the valve bore 115a along the axis line X1 by the introduced compressed air.

The flow rate adjustment device 100 adjusts a sectional area of a gap (diameter reduced portion) 116 which is formed between the valve bore 115a and the valve body portion 160 by adjusting the contrary force generated by the pressure chamber 121. As the sectional area of the gap 116 increases, the flow rate of the fluid circulated in the gap 116 increases. As the sectional area of the gap 116 decreases, the flow rate of the fluid circulated in the gap 116 decreases. In an interruption state in which the valve bore 115a and the valve body portion 160 are in contact, the flow rate of the fluid circulated in the gap 116 is zero.

The gap 116 is a diameter reduced portion which is disposed between the upstream-side fluid chamber 114 and the downstream-side fluid chamber 115, and the flow channel sectional area of the fluid flow channel formed in the body portion 110 is locally decreased at the diameter reduced portion. Accordingly, when the sectional area of the gap 116 decreases and the flow velocity of the fluid flowing through the gap 116 increases, charging is likely to occur in the body portion 110 due to a friction between the body portion 110 in the vicinity of the gap 116 and the fluid.

Figure 6:
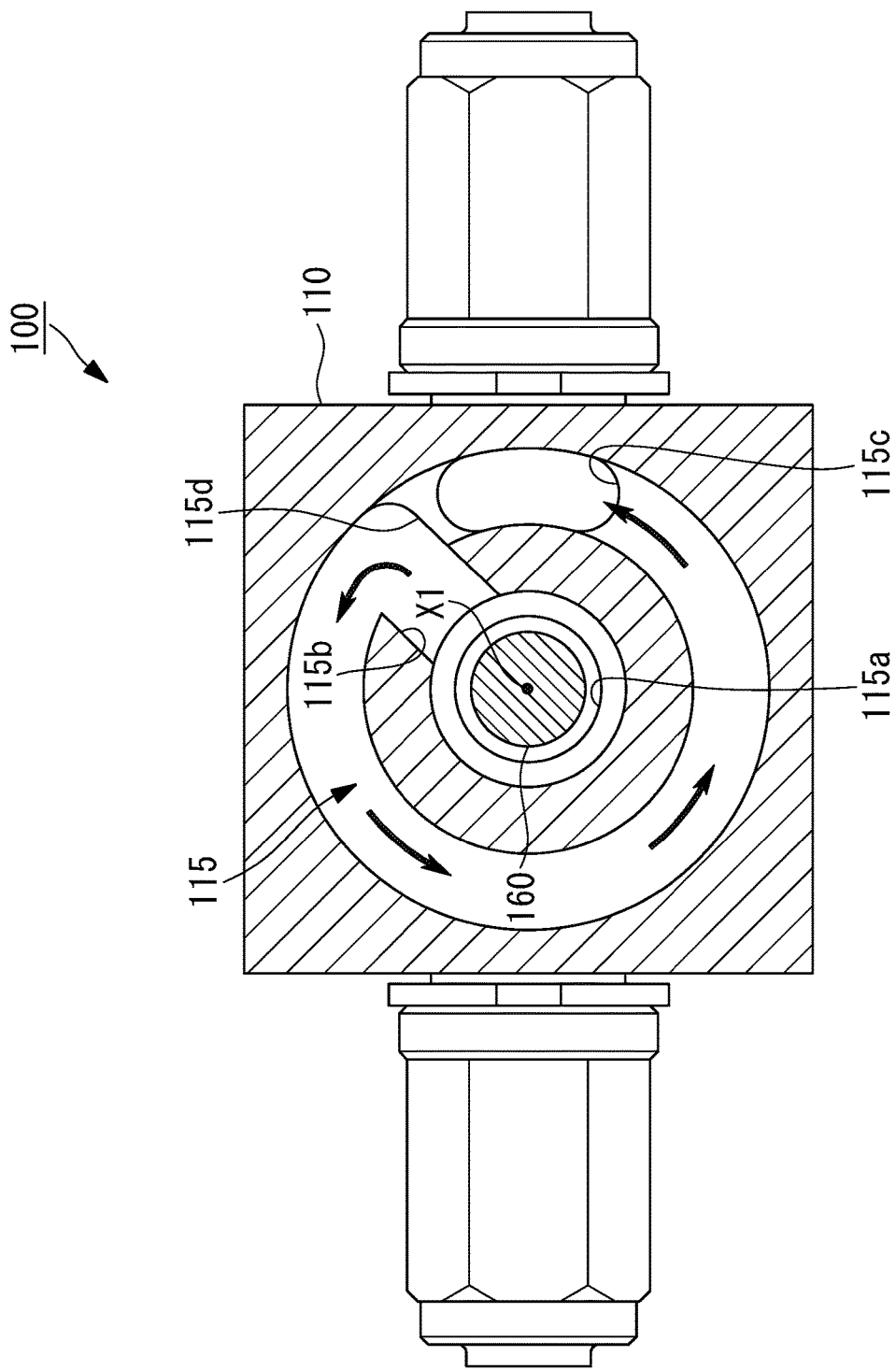
FIG. 6 is a sectional view taken along a line III-III of a flow rate adjustment device shown in FIG. 3.

As shown in FIG. 6, the downstream-side fluid chamber 115 is a flow channel which introduces the fluid flowing through the gap 116 from the communication flow channel 115b, and guides the fluid to an outflow hole 115c which communicates with the downstream-side flow channel 113b. The downstream-side fluid chamber 115 is a flow channel with a constant flow channel shape over substantially the periphery thereof about the axis line X1 where the fluid flows in from the communication flow channel 115b to the outflow hole 115c. Accordingly, a stable flow with a substantially constant flow velocity is formed at each position of the downstream-side fluid chamber 115, which makes it possible to prevent a defect due to an unstable flow.

The communication flow channel 115b is adjacent to a prevention wall 115d, which is disposed at a position adjacent to the outflow hole 115c, and guides the fluid to the position that is isolated from the outflow hole 115c by the prevention wall 115d. The prevention wall 115d prevents the fluid flowing into the downstream-side fluid chamber 115 from the communication flow channel 115b from being guided to the outflow hole 115c at a shortest distance, and prevents the fluid which has circulated through the downstream-side fluid chamber 115 and has reached the outflow hole 115c from flowing around the downstream-side fluid chamber 115 and reaching the position where the communication flow channel 115b is provided again.

Next, the material forming the body portion 110, the valve body portion 160, the first diaphragm portion 170, and the second diaphragm portion 190 will be described.

As described above, the fluid flow channel is formed in the body portion 110, and charging is likely to occur in the body portion 110 due to a friction between the body portion 110 and the fluid flowing through the fluid flow channel. In particular, since the flow velocity of the fluid increases in the vicinity of the gap 116, charging is more likely to occur.

Further, since the thin-film portion 171 of the first diaphragm portion 170 and the thin-film portion 192 of the second diaphragm portion 190 are formed into a thin film shape, when the thin-film portion 171 and the thin-film portion 192 are charged due to a friction with the fluid, a dielectric breakdown is likely to occur.

Accordingly, in the first embodiment, the occurrence of charging is prevented by imparting conductivity to the body portion 110, the valve body portion 160, the first diaphragm portion 170, and the second diaphragm portion 190.

Specifically, when the body portion 110 is electrically connected to the ground cable 10 via the conductive member 140, the body portion 110 is maintained at the ground potential. Further, when the first diaphragm portion 170 is electrically connected to the ground cable 11 via the conductive member 145, the first diaphragm portion 170, the valve body portion 160, and the second diaphragm portion 190 are maintained at the ground potential. The reason why the valve body portion 160 and the second diaphragm portion 190 are maintained at the ground potential is that the valve body portion 160 is coupled to the first diaphragm portion 170 and the second diaphragm portion 190 is coupled to the valve body portion 160.

The body portion 110, the valve body portion 160, the first diaphragm portion 170, and the second diaphragm portion 190 of the first embodiment are each formed of a conductive fluororesin material including a fluororesin material and carbon nanotubes dispersed in the fluororesin material. On the other hand, the upper housing 120, the lower housing 130, and the spring support portion 185 are formed of a non-conductive fluororesin material in which carbon nanotubes are not dispersed.

Examples of the fluororesin material used herein include PTFE (polytetrafluoroethylene), PCTFE (polychlorotrifluoroethylene), and PFA (tetrafluoroethylene-perfluoroalkyl vinyl ether copolymer).

As the fluororesin material, powder-like material (for example, PTFE G163 manufactured by ASAHI GLASS CO., LTD.) can be used.

Carbon nanotubes having, for example, the following characteristics are desirably used: having a fiber length in a range from 50 µm or more and 150 µm or less; having a fiber diameter in a range from 5 nm or more and 20 nm or less; having a bulk density in a range from 10 mg/cm$^3$ or more and 70 mg/cm$^3$ or less; having a G/D ratio in a range from 0.7 or more and 2.0 or less; having purity of 99.5% or more; formed of multiple layers (for example, 4 to 12 layers).

In this case, the reason why the fiber length of carbon nanotubes is set to 50 µm or more is that when the carbon nanotubes are dispersed in the fluororesin material, only a small number of carbon nanotubes are needed to impart a sufficient conductivity.

The G/D ratio is a value indicating a ratio of G-band peaks and D-band peaks which appear in a Raman spectrum of the carbon nanotubes. The G-band is derived from a graphite structure, and the D-band is derived from a defect. The G/D ratio indicates a ratio of purity of crystal to a defect concentration in the carbon nanotubes.

Figure 7:
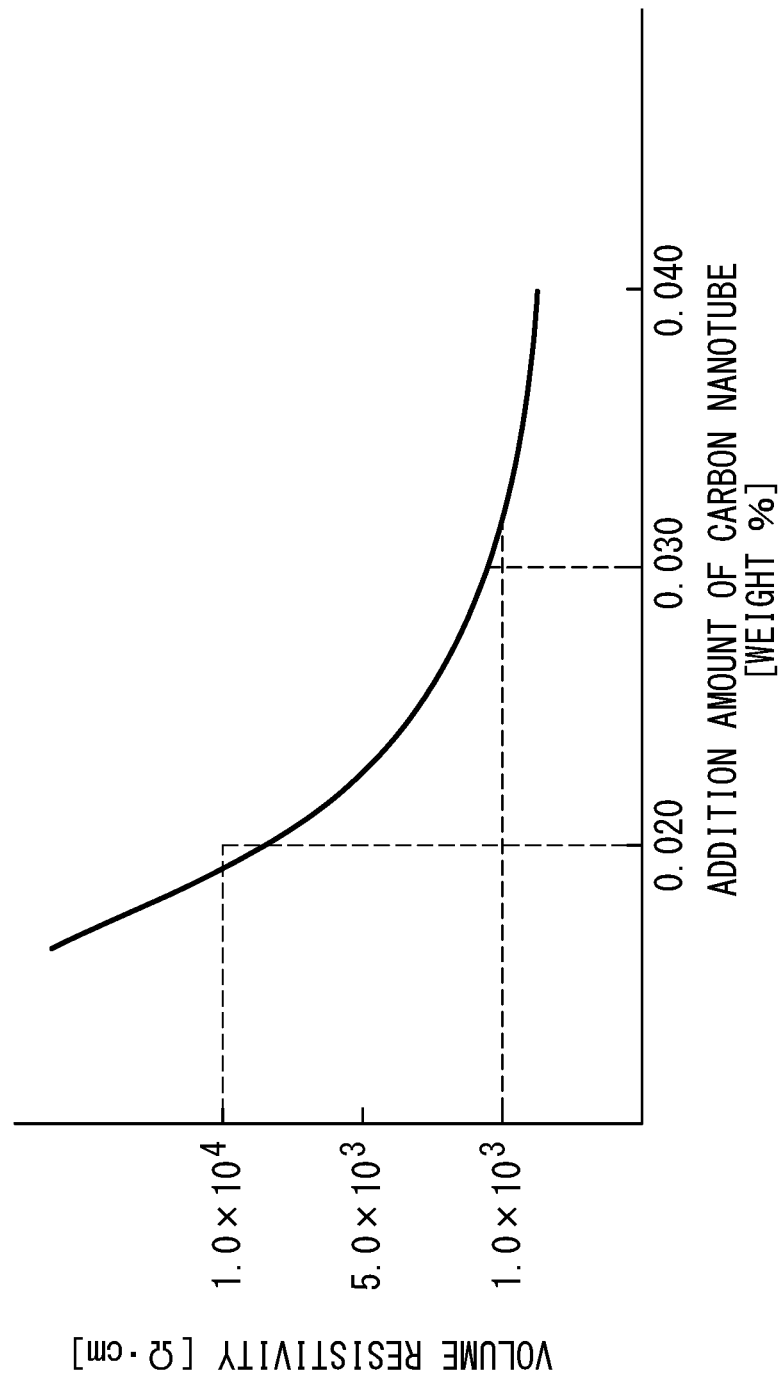
FIG. 7 is a graph showing a relationship between an additive amount of carbon nanotubes and a volume resistivity of a conductive fluororesin material.

The inventors have studied about the relationship between the additive amount (weight %) of carbon nanotubes dispersed in the fluororesin material and the volume resistivity (Ω·cm) of the conductive fluororesin material including the fluororesin material and the carbon nanotubes dispersed in the fluororesin material, and have obtained the results as shown in FIG. 7.

FIG. 7 shows the results of measurement of the volume resistivity of test pieces on the basis of "testing method for resistivity of conductive plastics with a four-point probe array" defined in JIS K 7194.

Multiple test pieces were prepared by performing melt-kneading using a kneader and then performing compression molding using a compression molding machine to thereby process the test pieces into a size compliant with JIS K 7194.

PTFE G163 manufactured by ASAHI GLASS CO., LTD. was used as the fluororesin material for creating the test pieces.

For measurement of the volume resistivity, a resistivity meter using a 4-point probe method compliant with JIS K 7194 was used. The 4-point probe method is a method in which four needle-like probes (electrodes) are brought into contact with the test pieces and the resistance of each test piece is obtained based on a current caused to flow between two outside probes and a potential difference generated between two inside probes.

The volume resistivity was calculated by averaging the measurement values obtained at multiple positions from the multiple test pieces.

According to the results shown in FIG. 7, the additive amount of carbon nanotubes was set in a range from 0.020 weight % or more and 0.030 weight % or less, so that the volume resistivity of the conductive fluororesin material was larger than $1.0\times10^3$ Ω·cm and less than $1.0\times10^4$ Ω·cm. This volume resistivity value is sufficiently smaller than the value ($10^{18}$ Ω·cm) of the volume resistivity of the fluororesin material in which carbon nanotubes are not dispersed.

The present inventors measured the charged voltage generated in the fluid flow channel 113 in a state where an air of 50 kPa is circulated in the fluid flow channel 113 by using the flow rate adjustment device 100 in which the body portion 110, the valve body portion 160, the first diaphragm portion 170, and the second diaphragm portion 190 are formed of a conductive fluororesin material containing carbon nanotubes at an additive amount of 0.025 weight %. The measurement result shows that the charged voltage generated at the fluid flow channel 113 is maintained at the about 0.2 kV.

On the other hand, the present inventors measured the charged voltage generated at the fluid flow channel 113 in a state where air of 50 kPa is circulated through the fluid flow channel 113 by using a flow rate adjustment device of Comparative Example in which the body portion 110, the valve body portion 160, the first diaphragm portion 170, and the second diaphragm portion 190, which are made of a fluororesin material with no carbon nanotubes are formed. The measurement result shows that the charged voltage generated at the fluid flow channel 113 is maintained at about 3.0 kV or more.

In the flow rate adjustment device of Comparative Example, when the conductive member 140 is not further connected to the ground cable 10, the measurement result shows that the charged voltage generated at the fluid flow channel 113 is maintained at about 16.0 kV or more.

From the above results, in the first embodiment, the conductive fluororesin material forming the body portion 110, the valve body portion 160, the first diaphragm portion 170, and the second diaphragm portion 190 of the flow rate adjustment device 100 contains carbon nanotubes at a ratio of 0.020 weight % or more and 0.030 weight % or less. The body portion 110 is connected to the ground cable 10 via the conductive member 140. Further, the first diaphragm portion 170 is connected to the ground cable 11 via the conductive member 145. As a result, the volume resistivity of the conductive fluororesin material is larger than $1.0\times10^3$ Ω·cm and less than $1.0\times10^4$ Ω·cm, and the charged voltage generated at the fluid flow channel 113 can be maintained at a small value of about 0.2 kV.

Figure 8:
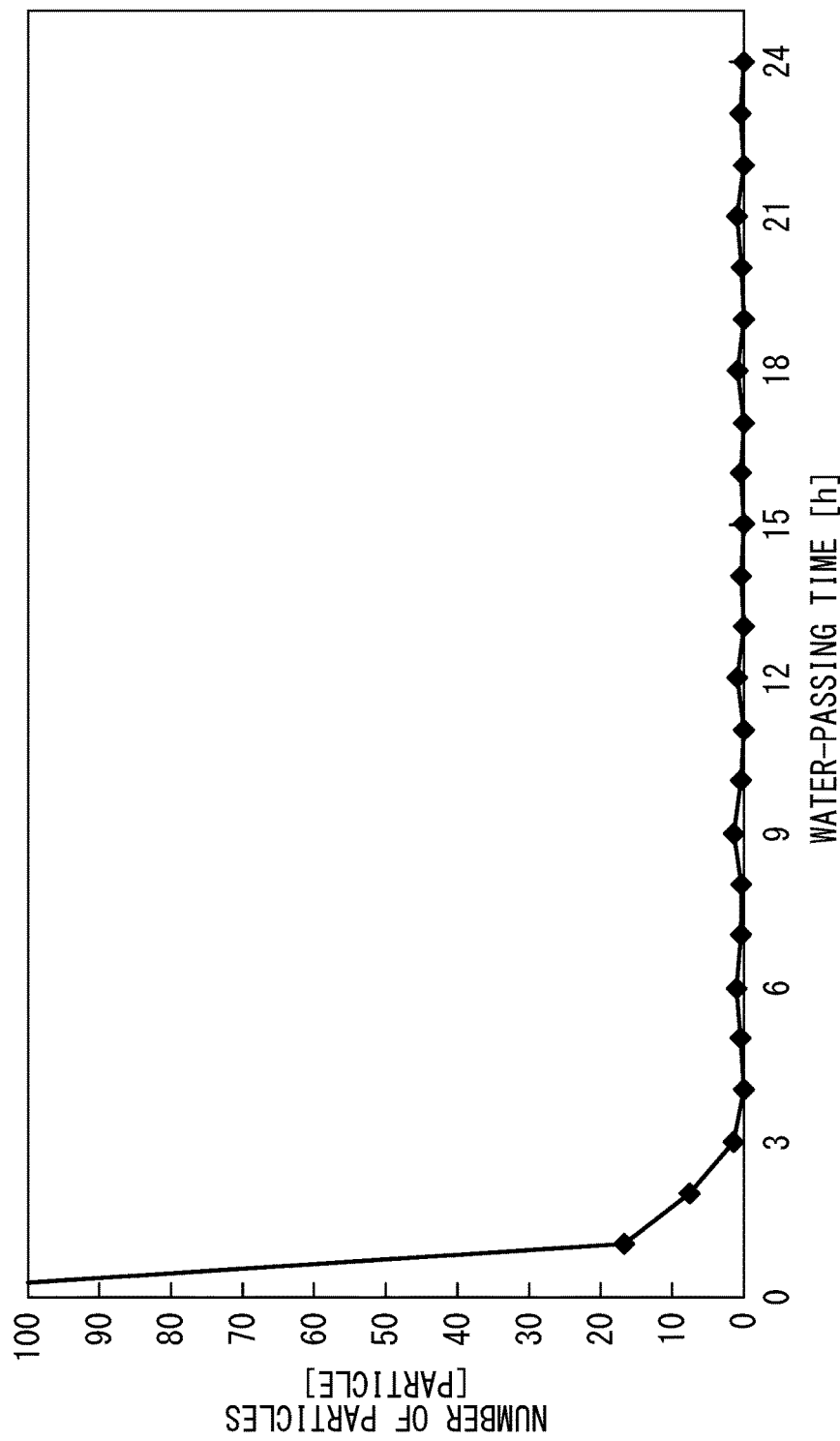
FIG. 8 is a graph showing a relationship between a time for flowing water and the number of particles.

The present inventors measured the number of particles contained in the fluid circulated through the fluid flow channel 113 by using the flow rate adjustment device 100 having a structure in which the body portion 110, the valve body portion 160, the first diaphragm portion 170, and the second diaphragm portion 190 are formed of a conductive fluororesin material containing carbon nanotubes at an additive amount of 0.025 weight %. FIG. 8 is a measurement result showing a relationship between a time for flowing water during which pure water was circulated and the number of particles measured by a particle counter (not shown).

The number of particles described herein refers to the number of particles which are contained in 1 ml of pure water and have a size of 0.04 μm or more.

In the measurement shown in FIG. 8, the flow ratio of pure water circulated through the fluid flow channel 113 was set to 0.5 liters/min. Further, an interruption state in which the circulation of pure water is interrupted by causing the valve body portion 160 to be in contact with the valve bore 115a and a circulation state in which the pure water is circulated by causing the valve body portion 160 to be isolated from the valve bore 115a were switched at intervals of five seconds. The temperature of the pure water was set to 25° C.

Although not shown in FIG. 8, the number of particles at the start of measurement (time for flowing water is zero) was about 340. After that, the number of particles gradually decreases over time for flowing water, and after a lapse of a water flowing time of three hours, the number of particles is maintained at 10 or less.

Thus, in the body portion 110 of the first embodiment, the ratio of the carbon nanotubes contained in the conductive fluororesin material is a small ratio of 0.030 weight % or less. Accordingly, unlike other granular conductive materials such as carbon black and iron powder, the contamination of the fluid due to contact between the fluid flow channel 113 and the fluid can be prevented.

The operation and effects of the flow rate adjustment device 100 of the first embodiment described above will be described below.

According to the flow rate adjustment device 100 of the first embodiment, the first diaphragm portion 170 which is coupled to the valve body portion 160 and isolates the upstream-side fluid chamber 114 from the spring accommodation chamber 131 which is adjacent to the upstream-side fluid chamber 114 is formed of a conductive fluororesin material having a volume resistivity of more than $1.0\times10^3$ Ω·cm and less than $1.0\times10^4$ Ω·cm. Further, the second diaphragm portion 190 which is coupled to the valve body portion 160 and isolates the downstream-side fluid chamber 115 from the pressure chamber 121 which is adjacent to the downstream-side fluid chamber 115 is formed of a conductive fluororesin material having a volume resistivity of more than $1.0\times10^3$ Ω·cm and less than $1.0\times10^4$ Ω·cm.

Thus, the volume resistivity of the conductive fluororesin material is set to a value sufficient to prevent charging due to a friction between the first diaphragm portion 170 and the fluid, thereby making it possible to prevent the occurrence of charging in the first diaphragm portion 170. Similarly, the volume resistivity of the conductive fluororesin material is set to a value sufficient to prevent charging due to a friction between the second diaphragm portion 190 and the fluid, thereby making it possible to prevent the occurrence of charging in the second diaphragm portion 190.

Accordingly, it is possible to prevent a defect that the diaphragm portion causes a dielectric breakdown and the fluid circulated through the fluid flow channel flows out from the diaphragm portion.

Further, in the flow rate adjustment device 100 of the first embodiment, the conductive fluororesin material contains carbon nanotubes at a ratio of 0.020 weight % or more and 0.030 weight % or less. A constant conductivity is imparted to the diaphragm portion by dispersing 0.020 weight % or more of carbon nanotubes in the conductive fluororesin material forming the diaphragm portion in direct contact with the fluid, thereby making it possible to prevent charging. This is because, when tube-like carbon nanotubes having a predetermined length are used as a conductive material, the conductivity can be imparted with a small number of carbon nanotubes, as compared with other granular conductive materials such as carbon black and iron powder.

Further, since the ratio of carbon nanotubes contained in the conductive fluororesin material is a small ratio of 0.030 weight % or less, it is possible to prevent the contamination of the fluid due to contact between the fluid flow channel and the fluid, as compared with other granular conductive material such as carbon black and iron powder.

Thus, according to the flow rate adjustment device 100 of the first embodiment, it is possible to prevent charging due to a friction between the diaphragm portion and the fluid and also prevent contamination of the fluid due to contact between the diaphragm portion and the fluid.

The flow rate adjustment device 100 of the first embodiment includes the spring 180 which is made of metal and disposed in the spring accommodation chamber 131. In the flow rate adjustment device 100 of the first embodiment, when the first diaphragm portion 170 is charged, a phenomenon of discharge toward the spring 180 disposed in the spring accommodation chamber 131 from the thin-film portion 171 of the first diaphragm portion 170 is likely to occur. When the discharge phenomenon occurs, the first diaphragm portion 170 may cause a dielectric breakdown. In the flow rate adjustment device 100 of the first embodiment, the volume resistivity of the conductive fluororesin material forming the first diaphragm portion 170 disposed adjacent to the spring 180 is larger than $1.0 \times 10^3$ Ω·cm and less than $1.0 \times 10^4$ Ω·cm. Accordingly, the volume resistivity of the first diaphragm portion 170 is set to a value sufficient to prevent charging due to a friction with the fluid, thereby making it possible to prevent the occurrence of charging in the first diaphragm portion 170.

The flow rate adjustment device 100 of the first embodiment further includes the conductive member 145 which is made of metal and attached in contact with the spring 180 and the first diaphragm portion 170. With this structure, the spring 180 is maintained at the same potential as the first diaphragm portion 170, thereby making it possible to prevent the occurrence of the phenomenon of discharge toward the spring 180 disposed in the spring accommodation chamber 131 from the first diaphragm portion 170.

Further, in the flow rate adjustment device 100 of the first embodiment, the body portion 110 is formed of a conductive fluororesin material. With this structure, the volume resistivity of the body portion 110 is set to a value sufficient to prevent charging due to a friction between the body portion 110 and the fluid, thereby making it possible to prevent the occurrence of charging in the body portion 110. Therefore, it is possible to prevent a defect that the body portion 110 is charged to cause a dielectric breakdown.

In the above description, the body portion 110 is formed of a conductive fluororesin material, but instead may be formed of a non-conductive fluororesin material. In this case, the valve body portion 160, the first diaphragm portion 170, and the second diaphragm portion 190 are formed of a conductive fluororesin material. Also in this case, since the thin-film portion 171 and the thin-film portion 192 are formed of a conductive fluororesin material, charging of the thin-film portion 171 and the thin-film portion 192, which are more likely to cause a dielectric breakdown can be appropriately prevented.

In the above description, the upper housing 120, the lower housing 130, and the spring support portion 185 are formed of a non-conductive fluororesin material in which carbon nanotubes are not dispersed, but may be formed of other aspects.

For example, the spring support portion 185 may be formed of a conductive fluororesin material. In this case, the thin-film portion 171 is electrically connected to the spring 180 via the spring support portion 185, thereby reliably preventing a defect that a dielectric breakdown occurs between the thin-film portion 171 and the spring 180.

Further, for example, all of the upper housing 120, the lower housing 130, and the spring support portion 185 may be formed of a conductive fluororesin material. With this structure, a defect that the members constituting the flow rate adjustment device 100 are charged can be reliably prevented.

Second Embodiment

A flow rate adjustment device 200 according to a second embodiment of the present disclosure will be described below with reference to the drawings. The flow rate adjustment device 200 is a fluid device which is installed in a pipe through which a fluid (liquid such as drug solution or pure water) used for semiconductor manufacturing devices and the like is circulated.

Figure 9:
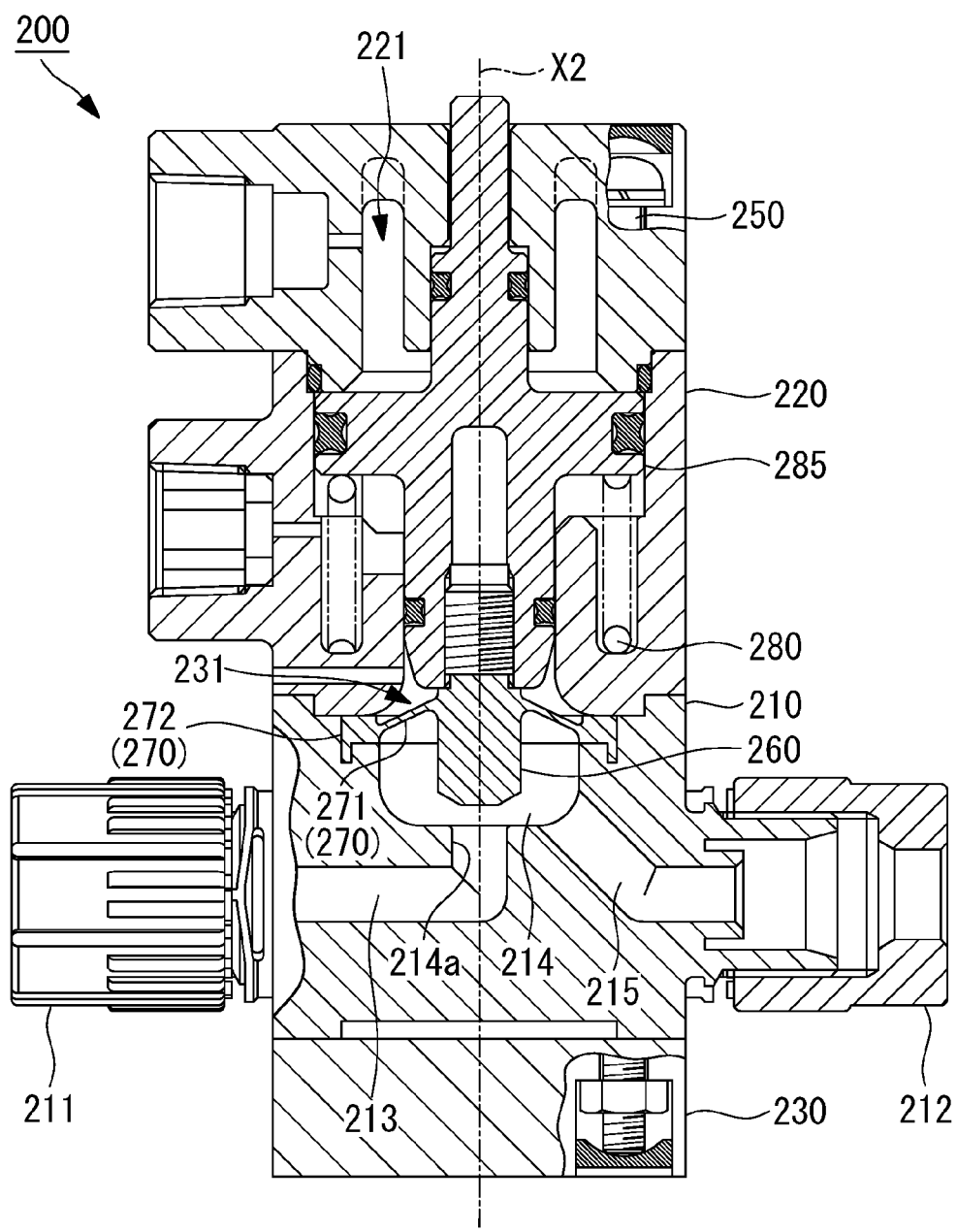
FIG. 9 is a longitudinal sectional view showing a flow rate adjustment device of a second embodiment.

As shown in FIG. 9, the flow rate adjustment device 200 includes a body portion 210, an upper housing 220, a lower housing 230, a valve body portion 260, a diaphragm portion 270, and a spring (metal member) 280 which is made of metal (for example, made of stainless steel).

As shown in FIG. 9, the body portion 210, the upper housing 220, and the lower housing 230 are integrated by fastening the upper housing 220 and the lower housing 230 with a fastening bolt 250 in a state where the body portion 210 is sandwiched therebetween.

The body portion 210 is a member in which an upstream-side flow channel 213, a fluid chamber 214, and a downstream-side flow channel 215, which guide the fluid from the inflow port 211 to the outflow port 212, are formed. The body portion 210 is formed of a conductive fluororesin material including a fluororesin material and carbon nanotubes dispersed in the fluororesin material. In this case, the conductive fluororesin material of the second embodiment is similar to the conductive fluororesin material of the first embodiment.

The body portion 210 is connected to a ground cable (not shown), which is maintained at an installation potential by a conductive member (not shown) made of metal, and is maintained at the ground potential.

Figure 10:
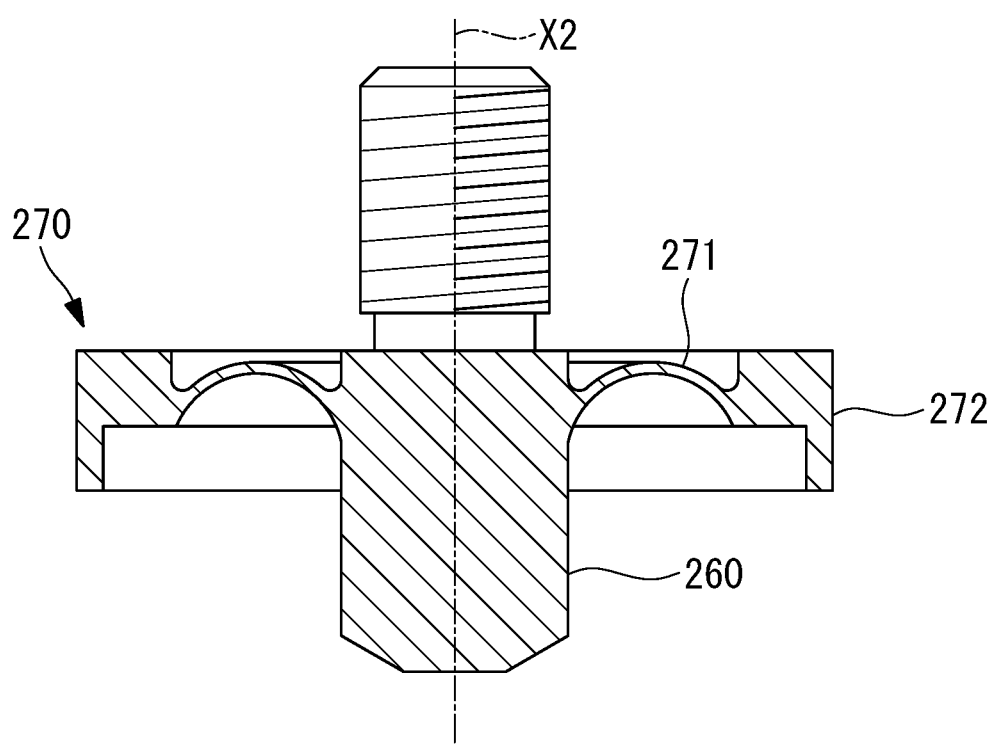
FIG. 10 is a longitudinal sectional view of a valve body portion and a diaphragm portion shown in FIG. 9.

As shown in FIG. 10, the valve body portion 260 is a member which is formed into a shaft shape along an axis line X2 and is inserted into a valve bore 214a which guides the fluid from the upstream-side flow channel 213 to the fluid chamber 214. The valve body portion 260 is configured to be movable along the axis line X2 by a contrary force generated by a pressure chamber 221 to be described later.

The fluid chamber 214 is a space which communicates with the upstream-side flow channel 213 and the downstream-side flow channel 215 and is formed between the body portion 210 and the lower surface of the diaphragm portion 270.

As shown in FIG. 10, the diaphragm portion 270 is a member which includes a thin-film portion 271 which is coupled to the outer peripheral surface of the valve body portion 260 disposed in the fluid chamber 214, and a base 272 which is coupled to the outer peripheral side of the thin-film portion 271.

The diaphragm portion 270 and the valve body portion 260 are integrally formed of a conductive fluororesin material. The thin-film portion 271 is formed into an annular shape about the axis line X2 and is formed into a thin film shape with a thickness of 0.2 mm to 0.5 mm. Accordingly, the thin-film portion 271 has flexibility that allows the thin-film portion 271 to be deformable along with a movement of the valve body portion 260 along the axis line X2.

As shown in FIG. 9, the diaphragm portion 270 is a member disposed in a state where the base 272 is sandwiched between the body portion 210 and the lower housing 230. The diaphragm portion 270 forms the fluid chamber 214 between the lower surface of the diaphragm portion 270 and the body portion 210, and forms the adjacent space 231 between the upper surface of the diaphragm portion 270 and the upper housing 220.

Thus, the diaphragm portion 270 is coupled to the valve body portion 260 and isolates the fluid chamber 214 from the adjacent space 231 which is adjacent to the fluid chamber 214.

The spring (metal member) 280 is a member which is made of metal (for example, made of stainless steel) and generates an urging force in a direction in which the valve body portion 260 is spaced apart from the valve bore 214a along the axis line X2 of the valve body portion 260. A lower end of the spring 280 is disposed in contact with the upper housing 220, and an upper end of the spring 280 is disposed in contact with the piston portion 285. A lower end of the piston portion 285 is coupled to an upper end of the valve body portion 260. Accordingly, the urging force generated by the spring 280 is transmitted to the upper end of the valve body portion 260 through the piston portion 285.

In the flow rate adjustment device 200 of the second embodiment, the fluid flow channel is formed in the body portion 210, and charging is likely to occur in the body portion 210 due to a friction between the body portion 210 and the fluid flowing through the fluid flow channel. Further, since the thin-film portion 271 of the diaphragm portion 270 is formed into a thin film shape, when the thin-film portion 271 is charged due to a friction with the fluid, a dielectric breakdown is likely to occur between the thin-film portion 271 and the spring 280. Accordingly, in the second embodiment, conductivity is imparted to the body portion 210, the valve body portion 260, and the diaphragm portion 270, thereby preventing the occurrence of charging in these components.

Specifically, the body portion 210 is electrically connected to a ground cable (not shown) via a conductive member (not shown), the body portion 210, the valve body portion 260, and the diaphragm portion 270 are maintained at the ground potential.

The body portion 210, the valve body portion 260, and the diaphragm portion 270 of the second embodiment are formed of a conductive fluororesin material including a fluororesin material and carbon nanotubes dispersed in the fluororesin material. On the other hand, the upper housing 220, the lower housing 230, and the piston portion 285 are formed of a non-conductive fluororesin material in which carbon nanotubes are not dispersed.

In the above description, the body portion 210 is formed of a conductive fluororesin material, but instead may be formed of a non-conductive fluororesin material. In this case, the valve body portion 260 and the diaphragm portion 270 are formed of a conductive fluororesin material. In this case, the valve body portion 260 and the diaphragm portion 270 is connected to a ground cable (not shown), which is maintained at an installation potential by a conductive member (not shown) made of metal, and is maintained at the ground potential. According to the second embodiment, since the thin-film portion 271 is formed of a conductive fluororesin material, it is possible to appropriately prevent charging of the thin-film portion 271 which is more likely to cause a dielectric breakdown.

In the above description, the upper housing 220, the lower housing 230, and the piston portion 285 are formed of a non-conductive fluororesin material in which carbon nanotubes are not dispersed, but instead may be formed of other aspects.

For example, the piston portion 285 may be formed of a conductive fluororesin material. In this case, since the thin-film portion 271 is electrically connected to the spring 280 via the piston portion 285, a defect that a dielectric breakdown occurs between the thin-film portion 271 and the spring 280 can be reliably prevented.

Further, for example, all of the upper housing 220, the lower housing 230, and the piston portion 285 may be formed of a conductive fluororesin material. With this structure, it is possible to reliably prevent a defect that the members constituting the flow rate adjustment device 200 are charged.

Third Embodiment

A flow rate adjustment device 300 according to a third embodiment of the present disclosure will be described below with reference to the drawings. The flow rate adjustment device 300 of the third embodiment is a fluid device which is installed in a pipe through which a fluid (liquid such as drug solution or pure water) used for semiconductor manufacturing devices and the like is circulated.

Figure 11:
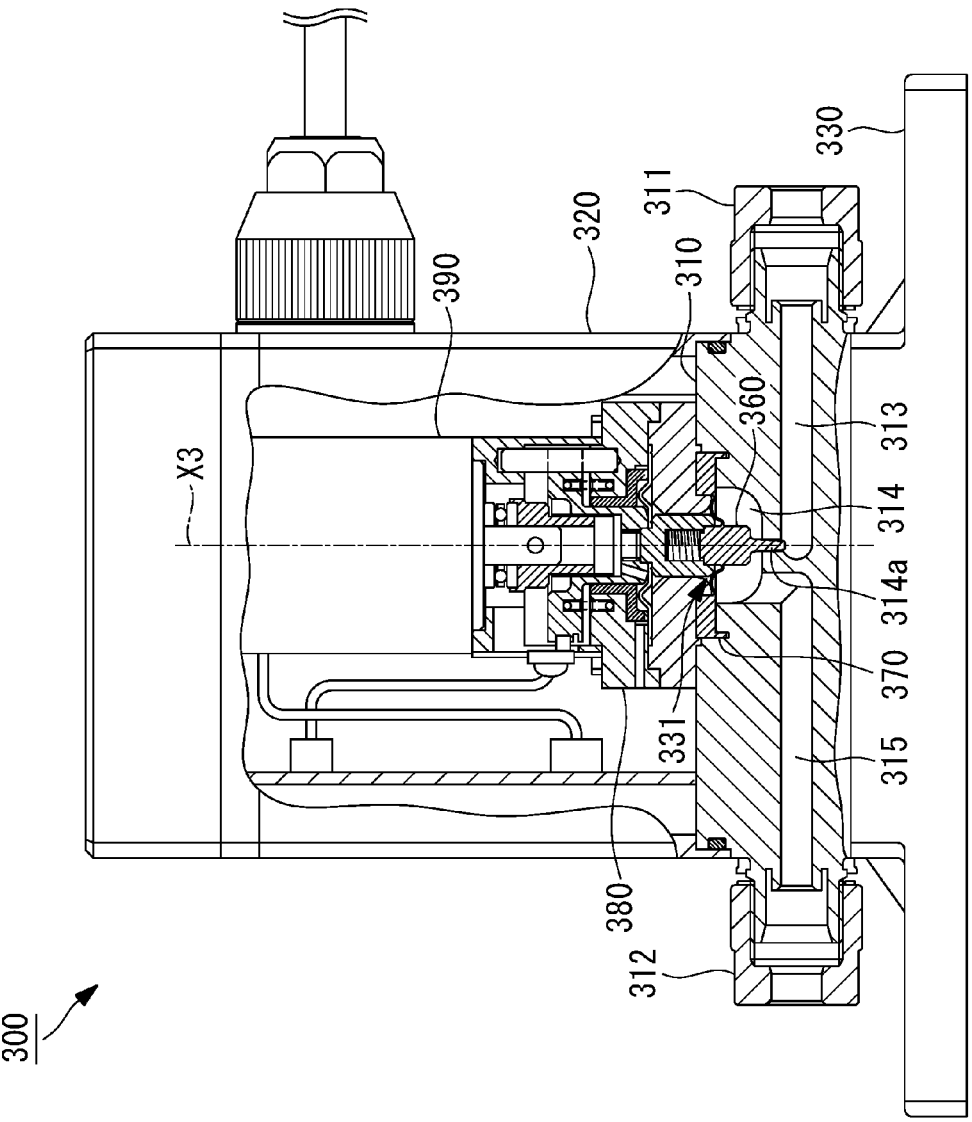
FIG. 11 is a longitudinal sectional view showing a flow rate adjustment device of a third embodiment.

As shown in FIG. 11, the flow rate adjustment device 300 includes: a body portion 310; an upper housing 320; a lower housing 330; a valve body portion 360; a diaphragm portion 370; a motor 390 which moves the valve body portion 360 along an axis line X3; and a motor support portion (metal member) 380 which is made of metal (for example, made of stainless steel).

The body portion 310 is a member in which an upstream-side flow channel 313, a fluid chamber 314, and a downstream-side flow channel 315, which guide the fluid from the inflow port 311 to the outflow port 312, are formed. The body portion 310 is formed of a conductive fluororesin material including a fluororesin material and carbon nanotubes dispersed in the fluororesin material. In this case, the conductive fluororesin material of the third embodiment is similar to the conductive fluororesin material of the first embodiment.

The body portion 310 is connected to a ground cable (not shown), which is maintained at an installation potential by a conductive member (not shown) made of metal, and is maintained at the ground potential.

As shown in FIG. 11, the valve body portion 360 is a member which is formed into a shaft shape along the axis line X3 and is inserted into a valve bore 314a which guides the fluid from the upstream-side flow channel 313 to the fluid chamber 314. The valve body portion 360 is configured to be movable along the axis line X3 by the drive force of the motor 390.

The fluid chamber 314 is a space which communicates with the upstream-side flow channel 313 and the downstream-side flow channel 315 and is formed between the body portion 310 and the lower surface of the diaphragm portion 370.

Figure 12:
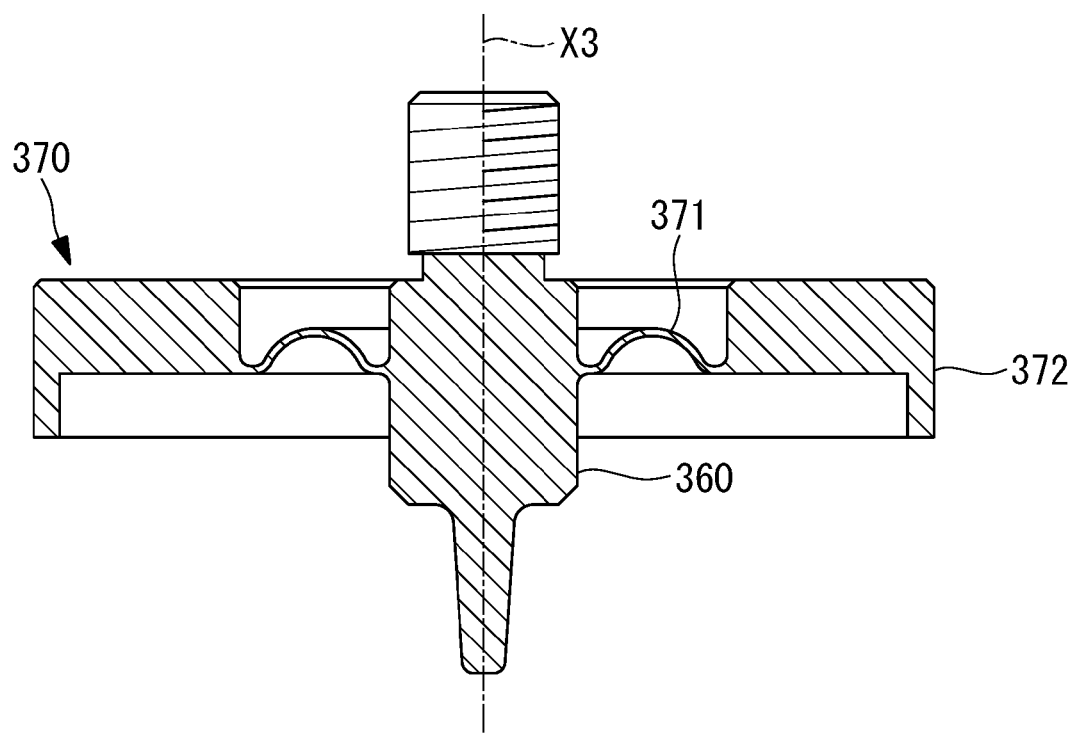
FIG. 12 is a longitudinal sectional view of a valve body portion and a diaphragm portion shown in FIG. 11.

As shown in FIG. 12, the diaphragm portion 370 is a member which includes a thin-film portion 371 which is coupled to the outer peripheral surface of the valve body portion 360 disposed in the fluid chamber 314, and a base 372 which is coupled to the outer peripheral side of the thin-film portion 371.

The diaphragm portion 370 and the valve body portion 360 are integrally formed of a conductive fluororesin material. The thin-film portion 371 is formed into an annular shape about the axis line X3 and is formed into a thin film shape with a thickness of 0.2 mm to 0.5 mm. Accordingly, the thin-film portion 371 has flexibility that allows the thin-film portion 371 to be deformable along with a movement of the valve body portion 360 along the axis line X3.

As shown in FIG. 11, the diaphragm portion 370 is a member which is disposed in a state where the base 372 is sandwiched between the body portion 310 and the lower housing 330. The diaphragm portion 370 forms the fluid chamber 314 between the lower surface of the diaphragm portion 370 and the body portion 310, and forms the adjacent space 331 between the upper surface of the diaphragm portion 370 and the upper housing 320.

Thus, the diaphragm portion 370 is coupled to the valve body portion 360 to isolate the fluid chamber 314 from the adjacent space 331 which is adjacent to the fluid chamber 314.

The motor support portion (metal member) 380 is a member which is made of metal (for example, made of stainless steel) for supporting the motor 390 with respect to the body portion 310.

In the flow rate adjustment device 300 of the third embodiment, the fluid flow channel is formed in the body portion 310 and charging is likely to occur in the body portion 310 due to a friction between the body portion 310 and the fluid flowing through the fluid flow channel. Further, since the thin-film portion 371 of the diaphragm portion 370 is formed into a thin film shape, when the thin-film portion 371 is charged due to a friction with the fluid, a dielectric breakdown is likely to occur between the thin-film portion 371 and the motor support portion 380. Accordingly, in the third embodiment, conductivity is imparted to the body portion 310, the valve body portion 360, and the diaphragm portion 370, thereby preventing the occurrence of charging in these components.

Specifically, when the body portion 310 is electrically connected to a ground cable (not shown) via a conductive member (not shown), the body portion 310, the valve body portion 360, and the diaphragm portion 370 are maintained at the ground potential.

The body portion 310, the valve body portion 360, and the diaphragm portion 370 of the third embodiment is formed of a conductive fluororesin material including a fluororesin material and carbon nanotubes dispersed in the fluororesin material. On the other hand, the upper housing 320 and the lower housing 330 are formed of a non-conductive fluororesin material in which carbon nanotubes are not dispersed.

In the above description, the body portion 310 is formed of a conductive fluororesin material, but instead may be formed of a non-conductive fluororesin material. In this case, the valve body portion 360 and the diaphragm portion 370 are formed of a conductive fluororesin material. Also in this case, the valve body portion 360 and the diaphragm portion 370 are connected to a ground cable (not shown) which is maintained at an installation potential by a conductive member (not shown) made of metal, and is maintained at the ground potential. According to the third embodiment, since the thin-film portion 371 is formed of a conductive fluororesin material, it is possible to appropriately prevent charging of the thin-film portion 371 which is more likely to cause a dielectric breakdown.

In the above description, the upper housing 320 and the lower housing 330 are formed of a non-conductive fluororesin material in which carbon nanotubes are not dispersed, but instead may be formed of other aspects. For example, the upper housing 320 and the lower housing 330 may be formed of a conductive fluororesin material. With this structure, it is possible to reliably prevent a defect due to charging of the members constituting the flow rate adjustment device 300.

The invention claimed is:

1. A fluid device that is installed in a pipe through which a fluid used for a semiconductor manufacturing apparatus is circulated, the fluid device comprising:
   a valve body portion configured to be movable along an axis line;
   a housing portion having a valve bore and a fluid flow channel formed therein, the valve body portion being inserted into the valve bore, the fluid flow channel being configured to circulate the fluid; and
   a thin film-like diaphragm portion coupled to the valve body portion and configured to isolate the fluid flow channel from an adjacent space adjacent to the fluid flow channel, wherein:
      the diaphragm portion is formed of a conductive fluororesin material including a fluororesin material and carbon nanotubes dispersed in the fluororesin material;
      wherein the conductive fluororesin material contains the carbon nanotubes at a ratio of 0.020 weight % or more and 0.030 weight % or less; and
      the conductive fluororesin material has a volume resistivity of more than $1.0 \times 10^3$ Ω·cm and less than $1.0 \times 10^4$ Ω·cm.

2. The fluid device according to claim 1, further comprising a metal member disposed in the adjacent space.

3. The fluid device according to claim 2, wherein the metal member is a spring configured to impart an urging force to the valve body portion in a direction along the axis line.

4. The fluid device according to claim 3, further comprising a conductive member made of metal, the conductive member being attached in contact with the spring and the diaphragm portion.

5. The fluid device according to claim 1, wherein the housing portion is formed of the conductive fluororesin material.

6. The fluid device according to claim 1, wherein the valve body portion and the diaphragm portion coupled to the valve body portion are integrally formed of the conductive fluororesin material.

7. A fluid device comprising:
   a valve body portion configured to be movable along an axis line;
   a housing portion having a valve bore and a fluid flow channel formed therein, the valve body portion being inserted into the valve bore, the fluid flow channel being configured to circulate a fluid; and
   a thin film-like diaphragm portion coupled to the valve body portion and configured to isolate the fluid flow channel from an adjacent space adjacent to the fluid flow channel, wherein:
      the fluid device is configured to be installed in a pipe through which the fluid used for a semiconductor manufacturing apparatus is circulated;
      the diaphragm portion is formed of a conductive fluororesin material including a fluororesin material and carbon nanotubes dispersed in the fluororesin material;
      wherein the conductive fluororesin material contains the carbon nanotubes at a ratio of 0.020 weight % or more and 0.030 weight % or less; and the conductive fluororesin material has a volume resistivity of more than $1.0 \times 10^3$ $\Omega \cdot$cm and less than $1.0 \times 10^4$ $\Omega \cdot$cm.

8. A system, comprising:

a semiconductor manufacturing apparatus;

a pipe through which a fluid for the semiconductor manufacturing apparatus circulates; and a fluid device installed in the pipe, the fluid device comprising:

a valve body portion configured to be movable along an axis line;

a housing portion having a valve bore and a fluid flow channel formed therein, the valve body portion being inserted into the valve bore, the fluid flow channel being configured to circulate the fluid; and a thin film-like diaphragm portion coupled to the valve body portion and configured to isolate the fluid flow channel from an adjacent space adjacent to the fluid flow channel, wherein:

the diaphragm portion is formed of a conductive fluororesin material including a fluororesin material and carbon nanotubes dispersed in the fluororesin material, wherein the conductive fluororesin material contains the carbon nanotubes at a ratio of 0.020 weight % or more and 0.030 weight % or less; and the conductive fluororesin material has a volume resistivity of more than $1.0 \times 10^3$ $\Omega \cdot$cm and less than $1.0 \times 10^4$ $\Omega \cdot$cm.

* * * * *